(12) United States Patent
Montgomery et al.

(10) Patent No.: US 11,277,973 B2
(45) Date of Patent: **\*Mar. 22, 2022**

(54) CYCLE AND SOAK IRRIGATION SYSTEMS AND METHODS

(71) Applicant: Rain Bird Corporation, Azusa, CA (US)

(72) Inventors: Randy R. Montgomery, Tucson, AZ (US); John E. Price, Tucson, AZ (US); Chong Wang Kwak, Tucson, AZ (US); Samuel C. Walker, Green Valley, AZ (US); David Charles Belongia, Quail Creek, AZ (US)

(73) Assignee: Rain Bird Corporation, Azusa, CA (US)

( * ) Notice: Subject to any disclaimer, the term of this patent is extended or adjusted under 35 U.S.C. 154(b) by 213 days.

This patent is subject to a terminal disclaimer.

(21) Appl. No.: 16/589,972

(22) Filed: Oct. 1, 2019

(65) Prior Publication Data

US 2020/0037509 A1   Feb. 6, 2020

Related U.S. Application Data

(63) Continuation of application No. 15/709,277, filed on Sep. 19, 2017, now Pat. No. 10,462,977.

(51) Int. Cl.
*A01G 7/04*   (2006.01)
*A01G 25/16*  (2006.01)
*A01C 1/00*   (2006.01)

(52) U.S. Cl.
CPC .............. *A01G 7/04* (2013.01); *A01G 25/16* (2013.01); *A01G 25/165* (2013.01); *A01G 25/167* (2013.01); *A01C 1/00* (2013.01)

(58) Field of Classification Search
CPC .... A01G 25/16; A01G 25/165; A01G 25/167; A01G 7/04; A01C 1/00; B05B 12/02
(Continued)

(56) References Cited

U.S. PATENT DOCUMENTS 2,786,418 A    3/1957  Peck
5,038,268 A *  8/1991  Krause ............... G05B 19/0428
                                                      239/69

(Continued)

OTHER PUBLICATIONS

AiHitech; "Smart Automatic Watering System with Bluetooth Timer Switch Auto Watering for Home Indoor Garden Flower Plant Irrigation"; https://www.amazon.com/Automatic-Watering-Bluetooth-Smartphone-Irrigation/dp/B01HVY9KS0?psc=1&SubscriptionId=AKIAI22YJBPO345JNP2A&tag=7reviews05-20&linkCode=sp1&camp=2025&creative=165953&creativeASIN=B01HVY9KS0; Prior to Sep. 19, 2017; pp. 1-6.

(Continued)

*Primary Examiner* — Steven J Ganey
(74) *Attorney, Agent, or Firm* — Fitch, Even, Tabin & Flannery LLP

(57) ABSTRACT

Several embodiments provide cycle and soak irrigation control units, comprising: a housing; a plurality of pairs of actuation line connectors comprising input connectors to couple with output actuation lines of a separate irrigation controller, and output connectors to couple with actuatable devices; a plurality of electrical pathways each coupling a respective input connector to a corresponding output connector and allowing an activation signal to be passed; at least one switch configured to selectively allow or interrupt activation signals to pass to a corresponding output connector; and a timing control circuit controlling the switch, based on an application of an activation signal on an input connector, a duration of a series of cycle-on timings during which the activation signal is emitted from the output (Continued)

connector to activate an actuatable device and soak-off timings during which the activation signal is prevented from being emitted deactivating the actuatable device.

22 Claims, 7 Drawing Sheets

(58) Field of Classification Search
USPC ......... 239/69, 63, 64, 70; 137/78.3; 700/284
See application file for complete search history.

(56) References Cited

U.S. PATENT DOCUMENTS

| | | | | |
|---|---|---|---|---|
| 5,207,380 | A * | 5/1993 | Harryman | G05D 22/02 239/64 |
| 5,337,957 | A * | 8/1994 | Olson | A01G 25/167 239/63 |
| 8,234,014 | B1 * | 7/2012 | Ingle | A01G 25/165 700/284 |
| 10,462,977 | B2 | 11/2019 | Montgomery | |
| 2005/0267641 | A1 * | 12/2005 | Nickerson | A01G 25/16 700/284 |
| 2010/0222932 | A1 * | 9/2010 | O'Connor | E03B 7/02 700/284 |

OTHER PUBLICATIONS

Claber; "Claber 8053 Oasis 4-Programs/20 Plants Garden Automatic Drip Watering System"; https://www.amazon.com/Claber-8053-4-Programs-Automatic-Watering/dp/B000U5YFR4?SubscriptionId=AKIAI22YJBPO345JNP2A&tag=7reviews05-20&linkCode=sp1&camp=2025&creative=165953&creativeASIN=B000U5YFR4; Prior to Sep. 19, 2017; pp. 1-8.
Continental; "Continental AWS-10 Automatic Watering Systems for Containers"; https://www.amazon.com/CONTINENTAL-AWS-10-Automatic-Watering-containers/dp/B007NHRYH0/ref=pd_sbs_86_2?_encoding=UTF8&pd_rd_i=B007NHRYH0&pd rd r=W2W0WK9HER4AHF289XGB&pd_rd_w=TH6eE&pd_rd_wg=j63Bi&psc=1&refRID=W2W0WK9HER4AHF289XGB; Prio rto Sep. 19, 2017; pp. 1-8.
Hunter Industries; "Cycle and Soak"; https://www.hunterindustries.com/support/pro-c-cycle-and-soak; Prior to Sep. 19, 2017; pp. 1-6.
Hunter Industries; "Wireless Rain-Clik/Rain-Clik"; "https://www.hunterindustries.com/irrigation-product/sensors/rain-clikr"; Prior to Sep. 19, 2017; pp. 1-4.
Intermatic; "R8800 & T8800 Series Electromechanical Time Switches"; Prior to Sep. 19, 2017; pp. 1-2.
Intermatic; "Time Controls: Specialty Time Switches"; https://www.intermatic.com/en-us/timer-controls/specialty-time-switches/r8806m101c; Prior to Sep. 19, 2017; pp. 1-3.
Irrigation Tutorials; "Installing a Pressure or Flow Sitch to Protect Your Irrigation System"; https://www.irrigationtutorials.com/pressure-switch-flow-switch/; Prior to Sep. 19, 2017; pp. 1-8.
Irrigationcaddy; "WiFi Web Based Irrigation Controller"; http://irrigationcaddy.com/products; Prior to Sep. 19, 2017; pp. 1-2.
K-State Research and Extension; "Soak and Cycle Lawn Irrigation—Do You Soak and Cycle?"; http://www.johnson.k-state.edu/lawn-garden/agent-articles/miscellaneous/soak-and-cycle-lawn-irrigation.html; Oct. 6, 2015; pp. 1-3.
Northern Water; "Rain Shutoff Device Comparison"; http://www.northernwater.org/docs/WaterConservation/LandscapeWatering/11_ RainShutoffDeviceTesting/Overview.html; Prior to Sep. 19, 2017; pp. 1-4.
Rachio; "Smart Cycle and Scheduling"; http://support.rachio.com/article/283-smart-cycle-overview; Jul. 18, 2017; pp. 1-8.
Rainmachine; Cycle and Soak; https://support.rainmachine.com/hc/en-US/articles/227779307-Cycle-and-Soak; Prior to Sep. 19, 2017; pp. 1-8.
RIS Irrigation Systems; "GardenmateTwo Dial Automatic Tap Timer User Guide"; Prior to Sep. 19, 2017; pp. 1-8.
Texas A&M Agrilife Research and Extension; "Cycle and Soak"; http://www.google.com/url?sa=t&rct=j&q=&esrc=s&source=web&cd=1&ved=0ahUKEwikw7e72JDTAhUC7IMKHYQtBugQFggcMAA&url=http%3A%2F%2Fwww.collegemoundwater.com%2FCycleandSoak.pdf&usg=AFQjCNHq2I-Y5Y_vU9SGRxtxp56ZvMeHPQ&bvm=bv.152174688,d.amc; Prior to Sep. 19, 2017; pp. 1-2.
Uploadarchief; "KG316T Micro Computer Timer Switch 1-Circuit"; https://www.uploadarchief.net/files/download/timer11.pdf; Prior to Sep. 19, 2017; pp. 1-4.
U.S. Appl. No. 15/709,277; Notice of Allowance dated Jun. 27, 2019.
U.S. Appl. No. 15/709,277; Office Action dated Mar. 4, 2019.
Van Der Lee Vineyard; "Arduino Control for Vineyard Irrigation"; http://vanderleevineyard.com/1/post/2015/04/arduino-control-for-vineyard-irrigation.html; Priorto Apr. 5, 2015; pp. 1-4.
Weathermatic; "SmartLine's Secret Weapon Against Runoff"; http://www.weathermatic.com/smartlines-secret-weapon-against-runoff-2/; 2015; pp. 1-3.
Yardeen; "Yardeen Electronic Water Timer Garden Irrigation Controller Digital Intellegence Watering System LCD Waterproof Color Blue"; https://www.amazon.com/Yardeen-Electronic-Irrigation-Controller-lntelligence/dp/B01LXC7XM2; Prior to Sep. 19, 2017; pp. 1-10.
Yardeen; "Yardeen Electronic Water Timer Irrigation System Waterproof with Rain Delay FUnction Color Blue"; https://www.amazon.com/Yardeen-Electronic-Water-Timer-Function/dp/B01LZM7PRD; Prior to Sep. 19, 2017; pp. 1-9.

* cited by examiner

CYCLE AND SOAK IRRIGATION SYSTEMS AND METHODS

CROSS-REFERENCE TO RELATED APPLICATION

This application is a continuation U.S. application Ser. No. 15/709,277, filed Sep. 19, 2017, which is incorporated herein by reference in its entirety.

TECHNICAL FIELD

The present invention relates to irrigation systems.

BACKGROUND

Irrigation systems traditionally are used in many different applications, including, for example, commercial applications, residential applications, and on golf courses. Such irrigation systems include irrigation controllers that control the activation of actuatable irrigation devices (e.g., valves, pumps, and other such devices to control the flow of water). Further, irrigating can be costly and can consume a relatively large quantity of water. As such, there is a need to improve irrigation.

SUMMARY OF THE INVENTION

Several embodiments provide cycle and soak irrigation control units, comprising: a housing; a plurality of pairs of actuation line connectors secured with the housing and each pair comprising an input connector and a corresponding output connector, wherein each input connector is configured to couple with at least one controller output actuation line of an irrigation controller, and wherein each output connector is configured to couple with at least one irrigation actuatable device configured to control a flow of water, wherein the irrigation controller is separate from and external to the cycle and soak irrigation control unit; a plurality of electrical pathways within the housing, each electrical pathway coupling a respective input connector to a respective corresponding output connector and allowing an activation signal received from the irrigation controller at the respective input connector via a respective one of the output actuation lines of the irrigation controller to be passed to the respective corresponding output connector; at least one switch configured to selectively allow or interrupt activation signals to pass from a respective input connector to a corresponding output connector; and a timing control circuit coupled with and controlling operation of the at least one switch, wherein the timing control circuit is configured to: detect an application of a first activation signal from the irrigation controller on the first input connector; and control the at least one switch according to a predefined cycle and soak sequence to control, in accordance with the first activation signal received from the irrigation controller, a duration of a series of cycle-on timings during which the first activation signal is emitted from the first output connector to activate a first actuatable device and soak-off timings during which the first activation signal is prevented from being emitted from the first output connector deactivating the first actuatable device.

Additionally, some embodiments provide methods of implementing irrigation cycle and soak functionality, comprising: detecting, at a first input connector of a first pair of actuation line connectors of a plurality of pairs of actuation line connectors cooperated with a housing, an application of a first activation signal from a separate and external irrigation controller; accessing a first cycle-on timing and a first soak-off timing; and repeatedly and sequentially controlling, in accordance with the first activation signal received from the irrigation controller, at least one switch according to a predefined cycle and soak sequence to control: durations consistent with the first cycle-on timing during which the first activation signal activates a separate and external first actuatable device, and durations consistent with the first soak-off timing during which the first activation signal is prevented from activating the first actuatable device.

BRIEF DESCRIPTION OF THE DRAWINGS

Disclosed herein are embodiments of systems, apparatuses and methods pertaining implementing and controlling irrigation. This description includes drawings, wherein.

Figure 1:
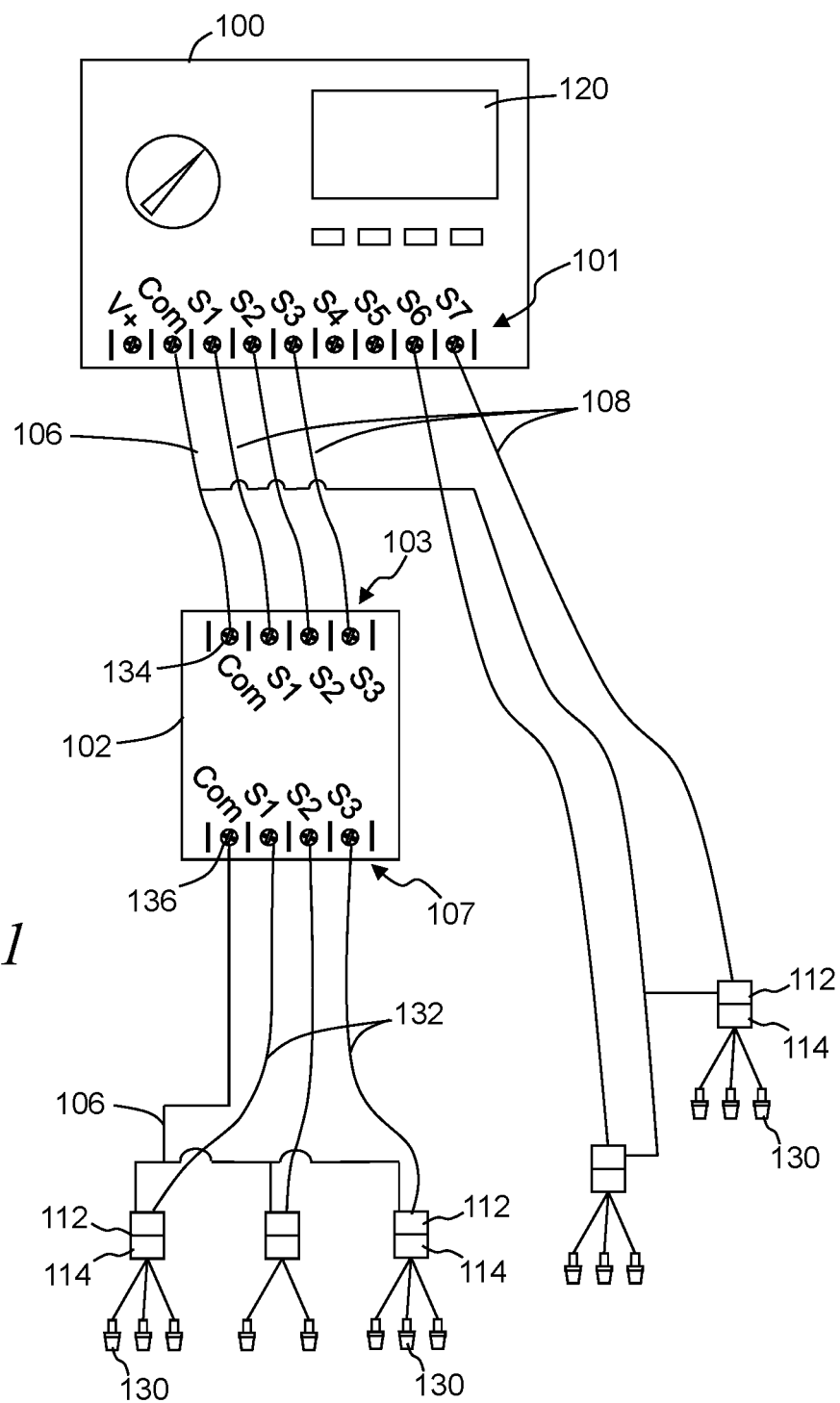
FIG. 1 illustrates a simplified block diagram of an exemplary irrigation system, in accordance with some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

The following description is not to be taken in a limiting sense, but is made merely for the purpose of describing the general principles of exemplary embodiments. Reference throughout this specification to "one embodiment," "an embodiment," "some embodiments", "an implementation", "some implementations", "some applications", or similar language means that a particular feature, structure, or characteristic described in connection with the embodiment is included in at least one embodiment of the present invention. Thus, appearances of the phrases "in one embodiment," "in an embodiment," "in some embodiments", "in some implementations", and similar language throughout this specification may, but do not necessarily, all refer to the same embodiment.

Some embodiments provide a cycle and soak irrigation control unit that cooperates with an irrigation controller to implement cycle and soak sequences external to the irrigation controller. As such, the cycle and soak control unit can be cooperated with an irrigation controller, and operates as an add-on to provide functionality that is often not available on the separate irrigation controller. It has been found to be beneficial to implement irrigation through a series of cycle-on and soak-off sequences. During the cycle-on period one or more irrigation devices and/or valves are activated to allow water to be released onto plants within one or more give areas and/or stations. During soak-off sequences, the water is temporarily halted for a soak period of time to allow water applied during the cycle-on period to soak into the soil. The system reduces or eliminates water run-off by allowing water to soak into the soil instead of running off the saturated upper layer of soil. Further, the reduced water run-off can also provide for reduced water consumption and cost savings.

Many older existing irrigation controllers that are already installed and in use do not provide the cycle-soak functionality. Further, some new irrigation controllers also do not provide this functionality. Some embodiments, however, provide the external cycle and soak control unit that can operate with and/or override an irrigation controller to implement the cycle and soak functionality.

Additionally, many water agencies are becoming ever more concerned with overwatering through irrigation systems, including in residential applications. Some agencies have moved to recommend using low precipitation rate nozzles as a way to reduce the amount of water applied during a normal run cycle. This in turn may reduce the water usage and the lost water due to run-off. Some advanced irrigation controllers offer the cycle and soak functionality. Again, the cycle and soak functionality causes a set of one or more sprinklers or other irrigation devices to be activated for a cycle-on set period of time, then turns off the sprinklers for a soak period of time so that the water can soak into the ground before returning to a cycle-on period to continue irrigating. Often, however, the overall run time is not always reduced. Additionally, installation of a new advanced irrigation controller is expensive from a home owner's point of view, particularly when the home owner already has an irrigation controller that is still in good operating condition.

Some embodiments provide a cycle and soak control unit that is separate from and operates in cooperation with the separate irrigation controller. The cycle and soak control unit, in at least some implementations, has a housing and a plurality of pairs of actuation line connectors secured with the housing. Each pair of actuation line connectors comprise an input connector and a corresponding output connector. Further, at least some of the input connectors are each configured to couple with one of a plurality of controller actuation lines of the separate and external irrigation controller. At least some of the output connectors are each configured to couple with at least one irrigation actuatable device, such as one or more valves, pumps, and other such irrigation actuatable devices, and/or other actuatable devices such as but not limited to lighting devices, fountain pumps, gas flow control devices, etc.

One or more switches are coupled to control the passage of activation signals between the input connectors and the output connectors of the pairs of actuation line connectors. Further, one or more timing control circuits or systems coupled with the switches, and is configured to detect an application of an activation signal from the irrigation controller on at least one of the input connectors, and to control the corresponding switch according to a predefined cycle and soak sequence to control, while the activation signal is received from the irrigation controller, a duration of a series of cycle-on timings during which the first activation signal is emitted from the corresponding output connector to activate at least one actuatable device and soak-off timings during which the activation signal is prevented from being emitted from the output connector deactivating the actuatable device.

FIG. 1 illustrates a simplified block diagram of an exemplary irrigation system, in accordance with some embodiments. The irrigation system comprises one or more irrigation controllers 100 having connectors 101, an irrigation cycle and soak control unit 102 having input connectors 103 and output connectors 107, one or more common lines 106, a plurality of actuation lines 108 (also referred to as station actuation lines), and one or more actuatable devices 114. The irrigation controller 100 is electrically coupled to the cycle and soak control unit 102 via at least the connectors 101 and input connectors 103 through the plurality of actuation lines 108, and in some instances the common line 106.

In some embodiments, the irrigation controller 100 (generically referred to as an electronic control device) is for example, a programmable irrigation controller that stores and executes one or more watering programs or schedules. The irrigation controller 100 includes one or more microcontrollers with one or more processors and one or more memory. In some implementations, the irrigation controller 100 includes a user interface 120 to allow the user to program the irrigation controller 100. The user interface may include a display that displays information to a user. The irrigation controller 100 controls the operation of one or more watering station or zones. For example, the irrigation controller 100 has station output connectors at connectors 101 for controlling seven different stations or zones in some embodiments. In accordance with some embodiments, each controllable station zone includes an actuatable device having an actuator, such as a solenoid 112 and an actuatable device, such as an irrigation valve 114. It should be understood that one or more stations or zones can be operated in the manner described herein. The solenoid 112 is electrically coupled to the cycle and soak control unit 102.

The cycle and soak control unit 102 controls the activation and deactivation of the actuator, which actuates the actuatable device. For example, in several embodiments, the cycle and soak control unit 102 activates and deactivates the solenoid 112 which in turn mechanically opens and closes the valve 114. In some embodiments, the cycle and soak control unit 102 is coupled to and controls the activation of multiple solenoids each corresponding to one of multiple valves or other actuatable devices. Similarly, the cycle and soak control unit can control actuatable devices in multiple different watering stations or zones.

It is noted that in other embodiments, the irrigation controller 100 is not necessarily a programmable irrigation controller. For example, the irrigation controller 100 has a set program functionality not programmable by a user, or the irrigation controller is under the control of another programmable irrigation controller (such as a central controller, a handheld controller, etc.), such that the other irrigation controller is programmable or otherwise executes one or more watering programs and sends instructions to the irrigation controller 100, which acts as a slave to the other controller and simply takes the instructed action (e.g., turn on or turn off a station). Additionally, it is understood that the irrigation controller 100 may be programmable on many different levels. For example, in some embodiments, the irrigation controller 100 includes a microprocessor, memory and an electronic user interface 120, and has many programmable features known in today's irrigation controllers. However, in some embodiments, the irrigation controller 100 is mechanically programmable by manipulating dials, buttons, switches, levers and the like that result in a timer-based schedule of station activation. Regardless of the specific type of irrigation controller, whether it is programmable or not, or the level or complexity of programmability, and in accordance with several embodiments, the irrigation controller 100 has a plurality of station output connectors 101 (or station output actuation connectors) that allow the coupling of a plurality of actuation lines 108 (station actuation lines). These station output connectors are configured to apply activation signals to the actuation lines that carry the station activation signals from the irrigation controller 100 to actuate actuatable devices, which in some forms, are irrigation valves, but in other forms, may be indoor/outdoor light devices, pumps, gas flow control devices, etc. In some embodiments, these activation signals take the form of an AC voltage wave that can be applied to actuate, for example, a non-latching solenoid so long as the AC voltage waveform is applied to the station actuation line by the station output connector. In other embodiments, the station activation signal may be a short pulse signal suitable to actuate a latching solenoid or another electrical signal suitable to actuate an electrical relay or switching device.

Traditionally, the irrigation controller 100 is coupled directly to an actuatable device through an actuation line 108. When it is time to activate a station for a zone to receive water, the irrigation controller 100 provides, for example, a solenoid 112 corresponding to the station with an activation signal (e.g., a 24 volt AC power signal) over the actuation line. The solenoid 112 opens the valve and the one or more irrigation devices 130 (e.g., sprinkler devices) corresponding to the station or zone receive water. When the irrigation controller determines it is time to stop watering in the zone, the irrigation controller stops providing the activation signal to the solenoid which then turns off the valve, or otherwise signals the solenoid to turn off the one or more valves.

Several embodiments allow for the same irrigation controller 100 to be utilized in an irrigation system that includes the cycle and soak control unit 102 as an intermediate add-on system between the irrigation controller and the wireline connections to the actuatable devices (e.g., solenoid activated valves). That is, traditionally, the actuation lines 108 are wires that are installed underground and run from the irrigation controller 100 to the actuatable device. The cycle and soak control unit 102 is positioned between the irrigation controller 100 and the actuatable devices, and controls the activation of the actuatable devices, which in some applications includes controlling the activation signals to the solenoids based on detected activation signals received from the connectors 101 of the irrigation controller 100.

In accordance with several embodiments, the irrigation controller 100 operates in the same manner as if it were not connected to the cycle and soak control unit 102. In other words, in some implementations the operation of the irrigation controller 100 is independent of the operation of the cycle and soak control unit 102. From the viewpoint of the irrigation controller 100, the actuation lines 108 at its connectors 101 are wireline connections direct to the actuatable devices (e.g., solenoids 112) in the field. The irrigation controller 100 is unaware that the cycle and soak control unit 102 exists or is positioned between the irrigation controller and the actuatable devices. Likewise, in some embodiments the operation of the cycle and soak control unit 102 is independent of the operation of the irrigation controller 100, other than the fact that the cycle and soak control unit 102 uses the station outputs of the irrigation controller 100 as its inputs. This provides the ability to add cycle and soak functionality to any existing irrigation system designed with station output connectors that operate with wireline actuation lines 108 without any modification to the irrigation controller 100, and typically without modification to the irrigation schedule or watering program of the irrigation controller. Advantageously, one would not need to replace an existing or traditional irrigation controller 100 with a new irrigation controller that has the cycle and soak functionality. Instead, the cycle and soak control unit 102 is configured to be coupled to either an existing irrigation controller or a new irrigation controller, and the irrigation controller 100 does not know the difference and/or the operation of the irrigation controller is not changed as a result of the interposed cycle and soak control unit 102.

In operation, in some embodiments, the irrigation controller 100 provides an activation signal (e.g., a 24 volt activation signal) at its output connectors 101 which normally go directly to an actuatable device 114 via a wireline connection, but instead are intercepted by the cycle and soak control unit 102 at the input connectors 103 over one of the plurality of actuation lines 108. The cycle and soak control unit 102 detects or senses that the activation signal has been received at an input connector 103 (e.g., the cycle and soak control unit receives an indication that the irrigation controller 100 intends to activate the station or zone). It is noted that when the irrigation controller 100 activates a station, this may reflect a decision made by the irrigation controller 100 when executing a watering program, or may reflect an action taken by the irrigation controller 100 (for example, in embodiments where the irrigation controller does not make a decision to activate a station, but simply follows an instruction to activate a station issued by another controller controlling the irrigation controller 100, such as a central controller or handheld controller). Thus, generically, the cycle and soak control unit 102 receives an indication that the irrigation controller 100 has activated a particular station. Once the cycle and soak control unit receives this indication, e.g., the cycle and soak control unit receives the activation signal, then the cycle and soak control unit 102 is activated to control a duration of on and off signals to the corresponding one or more actuatable devices associated with the station or zone consistent with programmed cycle-on timing and soak-off timing to achieve the desired cycle and soak operation, which can reduce run-off, may improve water absorption, and can reduce water usage.

Upon receiving the activation signal from the irrigation controller 100, the cycle and soak control unit 102 controls the output of activation signals to one or more actuators that actuate an actuatable device, e.g., the cycle and soak control unit outputs an activation signal on a corresponding output connector 107 to the respective solenoid 112 in order to activate the solenoid 112. In turn, the solenoid 112 opens the valve 114 that allows water to flow there through to one or more sprinkler devices 130 downstream. Generally, the solenoid 112, the valve 114 and the sprinkler devices are collectively referred to as a station or zone.

The cycle and soak control unit continues to control the activation signal based on the cycle-on timing and soak-off timing to control durations of when the activation signal is active on the respective output connector 107 and when the activation signal is interrupted for the soak-off timing. Further, the cycle and soak control unit continues to alternate between the cycle-on and soak-off states so long as the cycle and soak control unit receives the activation signal from the irrigation controller 100 over the actuation lines 108, and/or until a termination signal is received from the irrigation controller is received. In some instances, the irrigation controller may generate an activation signal that is intended triggers a latching solenoid, and thus does not maintain power on the actuation line 108. The cycle and soak control unit can detect the activation signal and control the outputted activation signals from the one or more output terminals until the termination signal is received from the irrigation controller intending to trigger the solenoid to turn off the valve.

In some embodiments, when the irrigation controller 100 intends that the valve 114 should be shut off, the irrigation controller 100 stops outputting the activation signal to the output connector 101 just as it would normally stop outputting the activation signal to a solenoid in prior systems. The cycle and soak control unit 102 senses the termination of the activation signal on the given actuation line 108 at the input connectors 103 and stops transmitting the wireless activation signal on the corresponding output connectors 107. In some embodiments, the cycle and soak control unit may continue to apply an activation signal from one or more output connectors 107 for a limited time after detecting that the irrigation controller has stopped the activation signal. For example, in some implementations, the cycle and soak control unit may complete a cycle-on duration when the cycle and soak control unit is in the cycle-on state when the cycle and soak control unit detects the stopping of the activation signal from the irrigation controller.

Figure 2:
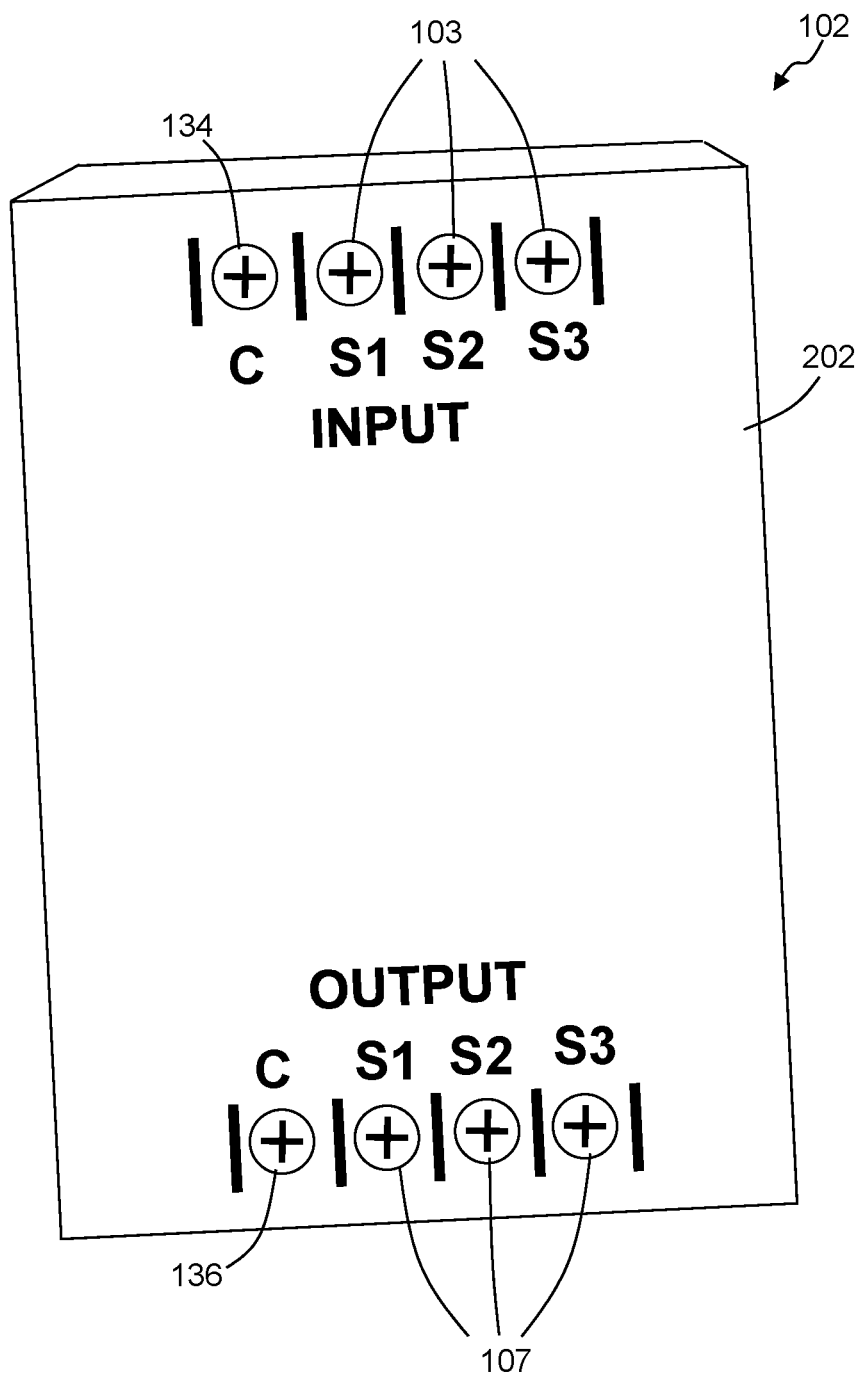
FIG. 2 illustrates a simplified block diagram of an exemplary cycle and soak irrigation control unit, in accordance with some embodiments.
Figure 3:
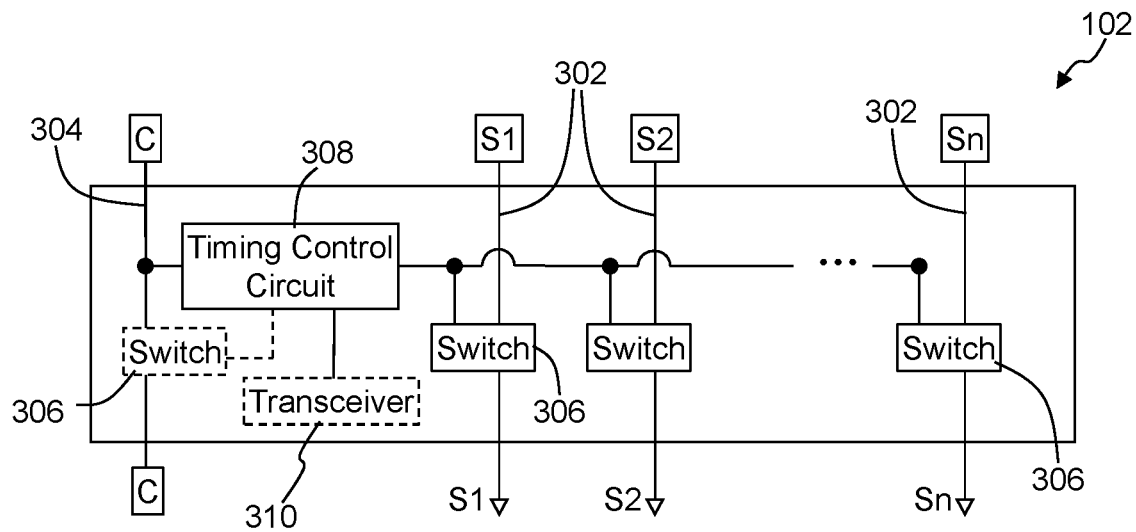
FIG. 3 illustrates a simplified schematic diagram of an exemplary cycle and soak control unit, in accordance to some embodiments.

FIG. 2 illustrates a simplified block diagram of an exemplary cycle and soak control unit 102, in accordance with some embodiments. FIG. 3 illustrates a simplified schematic diagram of an exemplary cycle and soak control unit 102, in accordance to some embodiments. Referring to FIGS. 1-3, the cycle and soak control unit has a housing 202 with which are secured a plurality of pairs of actuation line connectors 103, 107. Each pair of actuation line connectors includes an input connector 103 and a corresponding output connector 107. Each input connector 103 is configured to electrically couple with at least one output connector 101 of the irrigation controller 100 over at least one controller output station actuation line 108 from the irrigation controller. Each output connector 107 is configured to electrically couple over one or more station actuation lines 132 with at least one actuatable device 114, which may be configured to control a flow of water to one or more irrigation devices 130. The irrigation controller 100 is separate from and external to the cycle and soak control unit 102, and often separated by a distance. In some implementations, however, the housing 202 of the cycle and soak control unit can be secured with a separate housing of the irrigation controller while allowing coupling between the irrigation controller and the cycle and soak control unit over the actuation lines 108.

The cycle and soak control unit 102 includes the one or more pairs of actuation line connectors that are secured with the housing 202. An electrical pathway 302 is established within the housing 202 between each pair of input and output actuation line connectors 103, 107. Each electrical pathway 302 couples a respective input connector 103 to a respective corresponding output connector 107 and allows an activation signal received from the irrigation controller at the respective input connector 103 via a respective one of the output actuation lines 108 of the irrigation controller to be passed to the respective corresponding output connector 107. The output connectors 107 can be coupled to one or more actuatable devices 114 (e.g., a solenoid of a valve) via the station actuation lines 132 to conduct that activation signal to the actuatable device when the activation signal is applied at the output connector 107.

Typically, the cycle and soak control unit 102 includes a pair of common line connectors including a common line input connector 134 and a common line output connector 136. A common line electrical pathway 304 is established within the housing 202 between the input and output common line connectors 134, 136. The common line electrical pathway 304 provides for a common path or reference voltage for the actuatable devices 114.

In some embodiments, the cycle and soak control unit 102 further includes at least one switch 306 coupled with the common line electrical pathway 304 and/or the actuation line electrical pathways 302, and are configured to enable or disable the activation of one or more actuatable devices 114 consistent with one or more sets of programmed cycle-on timing and soak-off timing. Further, in some instances, one or more of the switches 306 cooperated on the actuation line electrical pathways 302 are configured to selectively allow or interrupt activation signals to pass from a respective input connector 103 to a corresponding output connector 107. The switch 306 on the common line electrical pathway can close or open the closed circuit allowing and disrupting the operation of the actuatable devices.

Further, some embodiments include a timing control circuit 308 that couples with and controls the operation of the one or more switches 306. The timing control circuit applies one or more sets of programmed cycle-on timings and soak-off timings in activating and deactivating the switch to control the actuatable devices 114. In some implementations, the timing control circuit is configured to detect and/or be activated based on an application of an activation signal from the irrigation controller 100 on one or more input connectors 103. Based on the activation signal, the timing control circuit 308 controls one or more of the switches 306 according to a predefined cycle and soak sequence to control (e.g., while the activation signal is received from the irrigation controller, in accordance with a detected runtime, etc.) a duration of a series of cycle-on timings during which the activation signal is emitted from the output connector to activate one or more actuatable devices and soak-off timings during which the activation signal is prevented from being emitted from the output connector deactivating the actuatable device. Additionally or alternatively, in some embodiments, the timing control circuit in controlling one or more switches controls the switch 306 coupled with the common line electrical pathway to control the activation and deactivation of the actuatable device as dictated by the timing control circuit consistent with the series of cycle-on timings and the soak-off timings.

In some implementations, the timing control circuit 308 further logs the control of the one or more activation signals through the cycle and soak control unit. The timing control circuit may include a processor that records, for example, timing of a detected activation signal, timing of each activation of the switch from an active or closed state to an interrupt or open state, timing of no longer detecting the activation signal, and/or other such information. Such data logged information may be stored in a local memory, communicated to the irrigation controller (e.g., encoded on one or more signals communicated over one or more station actuation lines 108, wirelessly communicated to the irrigation controller, user device or other device, transferred to a memory stick temporarily coupled with an input/output port of the cycle and soak control unit (e.g., USB, lightning connector port, or other such port), or other such communication methods.

In some embodiments, the cycle and soak control unit 102 includes one or more communication transceivers 310. For example, the transceiver may be a wireless communication transceiver configured to communicate via one or more wireless protocols (e.g., Wi-Fi, Bluetooth, cellular, etc.) with a user's personal device (e.g., smartphone, tablet, etc.), the irrigation controller 100, or other such system. In some embodiments, the wireless transceiver 310 couples with the timing control circuit 308 and is configured to wirelessly receive a defined duration of the at least one of the cycle-on timings and the soak-off timings, which can be stored and used by the timing control circuit. Additionally or alternatively the transceiver may be coupled with one or more of the input connectors 103 to receive communications from the irrigation controller. In other embodiments, the timing control circuit 308 is configured to detect from the irrigation controller a defined duration of the at least one of the cycle-on timings and the soak-off timings. The timing may be defined by encoding information within the activation signal that is detected by the time control circuit and applied to an appropriate electrical pathway 302.

Figure 4:
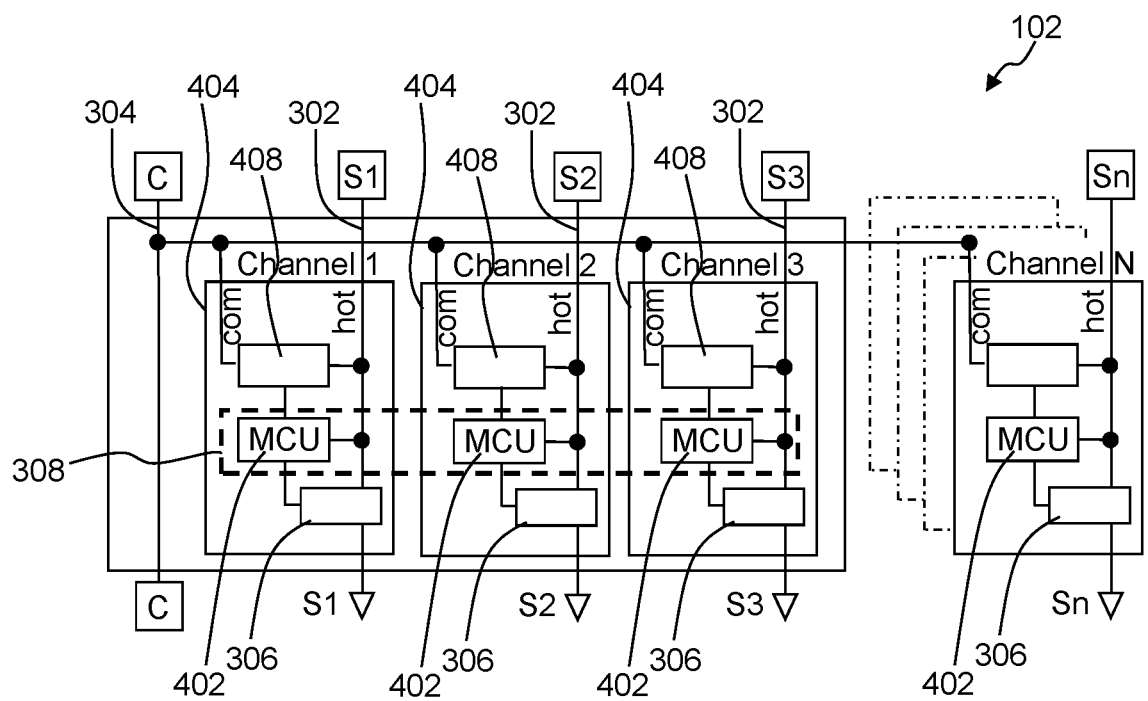
FIG. 4 illustrates a simplified schematic block diagram of an exemplary cycle and soak control unit, in accordance with some embodiments.

FIG. 4 illustrates a simplified schematic block diagram of an exemplary cycle and soak control unit 102, in accordance with some embodiments. Referring to FIGS. 1-4, in some embodiments the timing control circuit 308 includes multiple timing control units 402 each communicatively coupled with one or more switches 306. Further, in some instances, each of the plurality of switches couples with one or more of the plurality of electrical pathways 302 and/or the common line electrical pathway 304. One of the plurality of timing control units 402 are coupled with at least one of the plurality of switches and configured to independently control the respective at least one switch 306.

Additionally, in some embodiments, the cycle and soak control unit 102 is implemented with a plurality of independent cycle and soak modules 404, with each cycle and soak module 404 being associated with at least one of the electrical paths 302 providing channels for at least the different station actuation lines 108. Further, each of the cycle and soak modules 404 include at least one of the timing control units 402, and one or more of the plurality of switches 306 controlled and activated by the corresponding timing control unit 402. In some applications, one or more of the cycle and soak modules 404 couples with and/or includes at least one of the pairs of actuation line connectors 103, 107. A cycle and soak control unit 102 can include substantially any number of connector pairs, and substantially any number of cycle and soak modules 404 each corresponding to at least one pair of input and output connectors 103, 107. The limit on the number of connector pairs and/or cycle and soak modules is based on the desired size of the cycle and soak control unit 102, the desired number of pairs of input and output connectors, an expected cost to customers, and other such factors. Different cycle and soak control units 102 can be implemented with different numbers of pairs of input and output connectors, and corresponding cycle and soak modules 404. Further, one or more of the cycle and soak control units 102 can be utilized with a single irrigation controller 100.

The timing control units 402 can be implemented through one or more microcontrollers, processors, state machines, hardware, and/or other such circuitry and/or systems. In some embodiments, the timing control units are each implemented by separate microcontrollers having firmware storing one or more cycle-on timing and soak-off timing corresponding to the one or more corresponding station actuation lines. In other implementations, the microcontrollers are programmable to specified and/or selected one or more predefined sets of cycle-on timings and soak-off timings, and/or programmable to receive one or more specified cycle-on and soak-off timings, which can be stored in a local memory on the microcontroller or a separate memory accessible to the microcontroller. The switches 306 can be substantially any relevant switch, combination of switches and/or switching circuitry that are controlled by the timing control circuit 308 and can alternately interrupt and allow the activation signal to pass through the electrical pathways 302, 304. In some embodiments, the switches 306 are implemented through one or more triode thyristors (e.g., triodes for alternating current (TRIAC)), rectifiers, silicon controlled rectifiers (SCRs), solid-state switches, transistors, gate turn-off thyristors (GTOs), programmed switches, other such switches, or a combination of two or more of such switches. In some applications, the timing control units 402 may further be configured to decode information encoded in signals received at the input connectors 103 (e.g., encoded in activation signals), and/or one or more separate decoders may be coupled with the electrical pathways and timing control units providing decoded signals detected on the electrical pathways from the irrigation controller.

In some embodiments, the one or more of the cycle and soak modules 404 further draw power from a respective electrical pathway 302 to power the timing control circuit 308 and/or corresponding timing control units 402, and to control of the one or more switches 306. In some implementations, the timing control circuit 308, timing control units 402 and/or switches 306 may operate at a voltage other than that applied on the actuation lines 108. Some embodiments include one or more voltage regulators 408 that can provide power to and/or establish a voltage differential relative to the voltage on the actuation lines to power the timing control circuit 308, timing control units 402 and/or switches 306. In some instances, each cycle and soak module 404 includes at least one voltage regulator 408 to provide power to the components and/or circuits of the cycle and soak module. In such implementations, the timing control circuit 308 draws power from an activation signal in powering the timing control circuit and controlling one or more respective switches 306.

Figure 5:
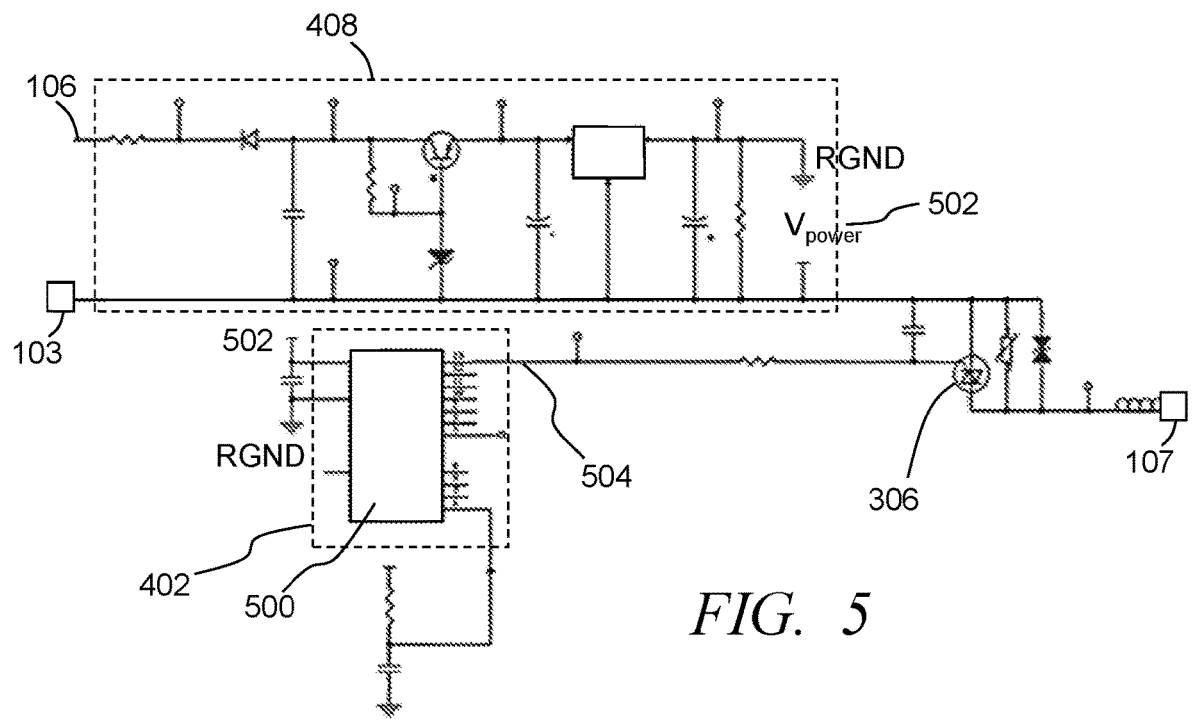
FIG. 5 illustrates a simplified schematic diagram of an exemplary cycle and soak module, in accordance with some embodiments.

FIG. 5 illustrates a simplified schematic diagram of an exemplary cycle and soak module 404, in accordance with some embodiments. The cycle and soak module 404 includes the microcontroller 500 implementing the timing control unit 402 coupled with the voltage regulator 408. The microcontroller 500 receives a power voltage (Vpower 502) provided by a voltage differential established by the voltage regulator 408 between an activation signal received at an input connector 103 from the station actuation line 108 and a reference ground (RGND) established by the voltage regulator 408. A switch signal output 504 of the microcontroller 500 couples with one or more switches 306. The microcontroller 500 utilizes the set of cycle-on timing and soak-off timing to control the switch. The outputted switch signal controls the switch 306 to prevent or allow the actuation signal to pass to the output connector 107 based on cycling through the series of cycle-on timings and soak-off timings. In some implementations, the microcontroller 500 may be implemented, for example, through one or more small outline integrated circuits (SOIC), or other relevant microcontroller.

Figure 6A:
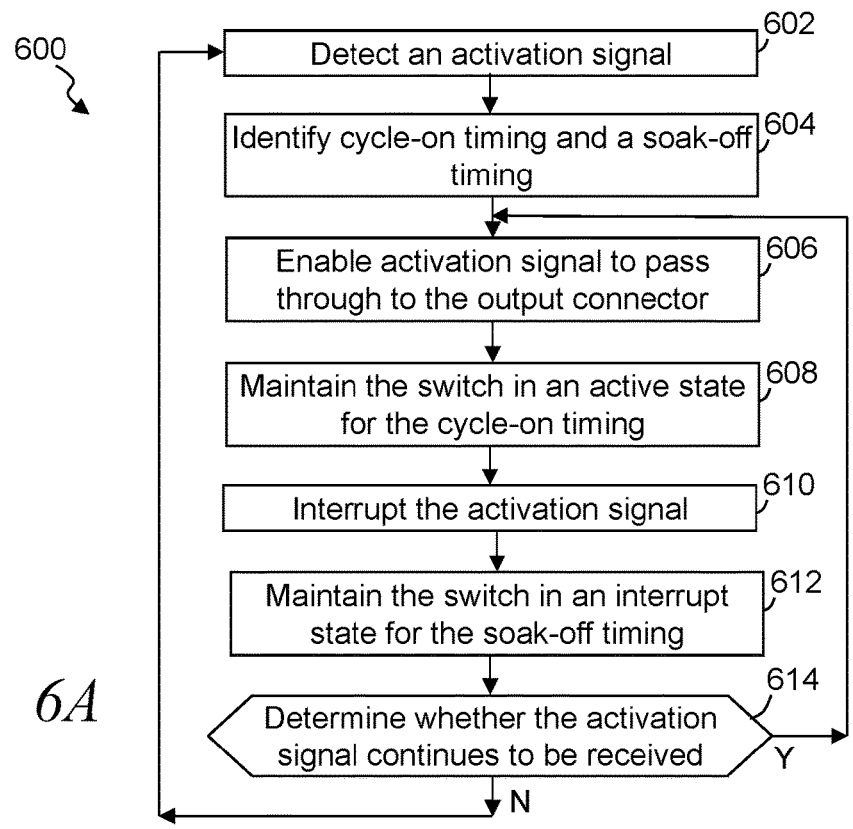
FIG. 6A illustrates a simplified flow diagram of an exemplary process of implementing irrigation cycle and soak functionality separate from an irrigation controller, in accordance with some embodiments.

FIG. 6A illustrates a simplified flow diagram of an exemplary process 600 of implementing irrigation cycle and soak functionality separate from an irrigation controller 100, in accordance with some embodiments. In step 602, an application of an activation signal is detected, from the separate and external irrigation controller 100, at an input connector 103 of a pair of actuation line connectors. As such, power is applied to at least one output connector 107. In some implementations, the input connector 103 is associated with one of multiple cycle and soak modules 404 of the cycle and soak control unit 102.

In step 604, a cycle-on timing and a soak-off timing are identified. In some implementations, the cycle-on and soak-off timing correspond to the input connector upon which the activation signal is received. Further, the cycle-on and soak-off timings may be predefined in firmware, while in other instances the cycle-on and soak-off timings may be defined, such as through a user interface of the cycle and soak control unit 102, through a wireless communication between the cycle and soak control unit 102 and a user's electronic device (e.g., smartphone, tablet, laptop, etc.), through the irrigation controller (e.g., programmed through the irrigation controller by the user, and communicated through modulated signals over one or more of the common line and/or the station actuation lines 108, or other such programming. Further, in some embodiments, multiple cycle-on and soak-off timings may be identified corresponding to the input connector, and thus, the one or more corresponding output connectors 107. Additionally, in some embodiments, the timing control circuit 308 may further identify the input and output connectors corresponding to the one or more received activation signals.

In step 606, the activation signal is allowed to pass through the one or more switches 306 associated with the activation signal with the one or more switches in a closed or active state so that the activation signal is outputted from the relevant output connectors 107 and supplied to the appropriate one or more actuatable devices 114. In some instances, the switch is configured to be in a closed state when there is not an activation signal applied to the input connector 103 and thus the electrical pathway 302 corresponding to the switch (e.g., in a closed state when the cycle and soak module 404 and/or the cycle and soak control unit 102 is in an inactive state). With the switch defaulting to the closed state, when an activation signal is applied to the input connector, the activation signal is passed through the cycle and soak control unit to be applied to the corresponding actuatable device 114. In other implementations, the timing control circuit triggers one or more switches to be in the closed state. In step 608, the timing control circuit 308 activates a timer and identifies when the activation signal has been allowed to pass through the switch for the identified cycle-on timing.

In step 610, the one or more switches 306 are triggered to transition to an open or interrupt state interrupting the activation signal. In step 612, the timing control circuit 308 continues to track the time that the activation signal has been prevented from passing through the switch, and identifies when the activation signal has been interrupted for the identified soak-off timing. The process can repeatedly and sequentially control the closing and opening of the switch while the first activation signal is received from the irrigation controller and/or to achieve a total cycle-on time consistent with the duration the activation signal is received from the irrigation controller. In some embodiments, the process repeatedly and sequentially controls at least one switch according to the predefined cycle and soak sequence to control durations consistent with the cycle-on timing during which the activation signal activates the separate and external actuatable device 114, and durations consistent with the soak-off timing during which the activation signal is prevented from activating the actuatable device.

As such, in some implementations, the process 600 includes step 614 where it is determined whether the activation signal continues to be applied at the input connector 103. When the activation signal continues to be applied, the process returns to step 606 to close the switch 306 to again allow the activation signal to pass through the cycle and soak control unit 102 to the relevant actuatable device(s) 114, and again in step 608 tracks the time that the switch is closed. Further, in some implementations, when it is determined in step 614 that the activation signal is no longer detected, the process returns to step 602 to await the detection of the activation signal at the input connector 103. In some embodiments, the process includes an override interrupt that halts the process 600 in response to the activation signal no longer being applied to the input connector. The timing control circuit may further force the switch to the default state (e.g., closed state in some applications). This forced default state may be achieved through power from one or more capacitors or other storage devices that are charged while the activation signal was being applied. In other instances, the cycle and soak control unit 102 may include a separate power source (e.g., a battery, solar power, power from an output voltage on the irrigation controller, an external power source (e.g., plugged into a wall socket), and/or other such external power source). In many applications, however, the cycle and soak control unit 102 is powered by the applied activation signals by the irrigation controller on the station actuation lines 108.

In some embodiments, the timing control circuit 308, one or more timing control units 402 and/or a separate microcontroller are configured continue to cycle through the cycle-on and soak-off timings until an accumulated or total cycle-on timing is equal to (or within some threshold of, within a predefined percentage of, or some other predefined variation of) the programmed runtime intended by the irrigation controller 100. Often, the total irrigation program runtime for a zone (or cooperated set of irrigation devices 130 and/or actuatable device 114) by an irrigation controller causes a predefined quantity of water to be applied to the plant life of that zone (e.g., flow rate through the one or more sprinklers times the total runtime of those one or more sprinklers). Often the setting of the one or more runtimes of a zone is to achieve a desired quantity of water to be applied to the plant life of that zone. Accordingly, the runtime is often set to cause a desired quantity of water to be applied to the plant life. As such, the cycle and soak unit 102 in some implementations can be configured to determine an intended total runtime on an input connector 103, and continue to cycle through the cycle-on and soak-off timings until a summation of the cycle-on timings is equal to (or within a threshold of) the programmed runtime. This provides substantially the same quantity of intended water to the plant life, while also providing the benefit of the soak-off timing to allow a greater quantity of the water to be received by the plant life and reducing run-off. The total time to deliver the intended quantity of water is increased based on the total soak-off timings, while still delivering the programmed quantity of water or at least a quantity of water that is within a threshold of the programmed quantity.

Accordingly, in some embodiments, the timing control circuit 308, timing control units 402 and/or one or more separate controllers are configured to monitor, for each input connector 103, the time that an activation signal is being applied by the irrigation controller to that particular input connector 103. The total programmed runtime can then be determined based on the duration of time that an activation signal is applied to the input connector. In some embodiments, the cycle and soak control unit 102 can continue to implement the cycle-on and soak-off timing even after the activation signal is no longer applied to the input connector, while tracking the cycle-on timings to stop irrigation when the total cycle-on time is equal to or within a threshold of the detected duration of time the activation signal is detected at the input connector 103.

Some embodiments further implement the cycle-on and soak-off timings between different input connectors (and thus different zones) to account for available water pressure. As such, the cycle and soak control unit 102 may continue to allow the cycle-on and soak-off timings relative to a first connector pair 103, 107 even after the activation signal is no longer received at the input connector 103, and delay an activation signal from one or more other output connectors 107 of one or more other connector pairs even though one or more subsequent activations signals may be detected at the one or more other input connectors 103 of those other connector pairs. The timing of the activation signals on those one or more other connector pairs continues to be tracked, and the cycle and soak control unit 102 subsequently implements the respective cycle-on and soak-off timings for each of those other connector pairs. In other implementations, the cycle and soak control unit may interrupt the cycle-on activation signal at a first connector output in response to a termination of the activation signal at the corresponding first input connector, and later return to the first connector pair (e.g., after activation signals are no longer detected on one of the input connectors), to continue to transition between cycle-on and soak-off states until the summation of cycle-on timings is equal to or within a threshold of the detected duration of the activation signal on that first input connector. In some embodiments, the timing control circuit 103 and/or a separate controller tracks the separate activation signals (e.g., when stations are programmed to turn on and off as signaled by the irrigation controller 100), and space out the activation signals across the multiple different connector pairs, which in part can compensate for a potential reduction in water pressure than may adversely affect the distribution of water from the irrigation devices 130. In some embodiments, cycle-on and soak-off timing is continued relative to a first connector pair even after the activation signal is no longer detected at the first activation pair and is instead detected on a second activation pair, until the total cycle-on timing is within the threshold of the duration of the activation of that connector pair; and one or more subsequent connector pairs can be queued up and the durations of the activation signals for those pairs are detected, and sequentially controlled until the total cycle-on timing for those pairs is within a threshold of the detected durations. In other instances, the cycle and soak process for a first connector pair can be put on hold while one or more subsequent connector pairs are activated, and the cycle and soak control unit can later return to the first connector pair and complete the irrigation for that connector pair. Some embodiments additionally or alternatively utilize the soak-off timings of one connector pair to implement some or all of a single cycle-on timing for one or more other connector pairs in accumulating cycle-on timings for those one or more connector pairs that accumulate to the total activation duration. Further, some implementations may modify soak-off timings of a connector pair to accommodate one or more cycle-on timings of one or more other connector pairs.

Figure 6B:
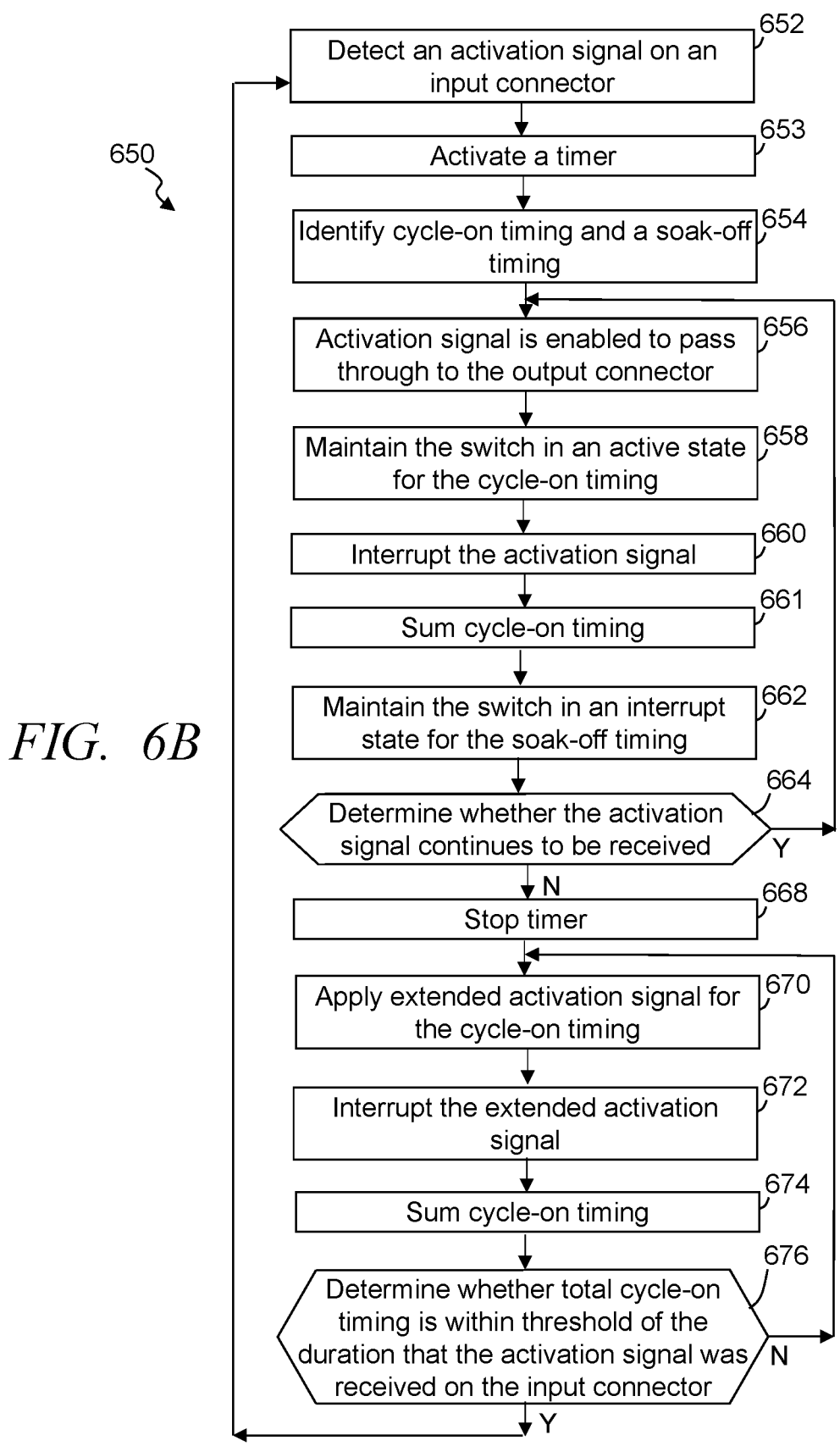
FIG. 6B illustrates a simplified flow diagram of an exemplary process of implementing irrigation cycle and soak functionality separate from an irrigation controller, in accordance with some embodiments.

FIG. 6B illustrates a simplified flow diagram of an exemplary process 650 of implementing irrigation cycle and soak functionality separate from an irrigation controller 100, in accordance with some embodiments. In step 652, an application of an activation signal is detected, from the separate and external irrigation controller 100, at an input connector 103 of a first of the many pairs of actuation line connectors. In some applications, the cycle and soak control unit is configured to detect activation signals applied simultaneously at multiple different input connectors 103 and separately track the different activation signals. In step 653 an active signal timer is triggered to track the duration of the active signal. In some implementations, the process 650 is implemented separately for each pair of input and output connectors.

In step 654, a cycle-on timing and a soak-off timing are identified. In step 656, the cycle-on state is implemented and the activation signal is allowed to pass through the one or more switches 306 associated with the activation signal with the one or more switches in a closed or active state so that the activation signal is outputted from the relevant output connectors 107 and supplied to the appropriate one or more actuatable devices 114. During the cycle-on period power is applied to at least the corresponding output connector 107 of the connector pair. In some implementations, the input connector 103 is associated with one of multiple cycle and soak modules 404 of the cycle and soak control unit 102, and the corresponding timing control unit 402 tracks the activation signal on the respective input connector. In other implementations, a separate and/or dedicated microcontroller tracks the duration of activation signals applied to one or more input connectors 103. In step 658, the timing control circuit 308 activates a timer and identifies when the activation signal has been allowed to pass through one or more switches 306 for the identified cycle-on timing.

In step 660, the one or more switches 306 are triggered to transition to an open or interrupt state interrupting the activation signal. In step 661, the duration of the cycle-on time is summed with the summation of the duration of previous cycle-on timings while the activation signal continues to be applied on the input connector. In step 662, the timing control circuit 308 continues to track the time that the activation signal has been prevented from passing through the switch, and identifies when the activation signal has been interrupted for the identified soak-off timing. The process can repeatedly and sequentially control the closing and opening of the one or more switches while the activation signal is received from the irrigation controller. In some embodiments, the process repeatedly and sequentially controls at least one switch 306 according to the predefined cycle and soak sequence to control durations consistent with the cycle-on timing during which the activation signal activates the separate and external actuatable device 114, and durations consistent with the soak-off timing during which the activation signal is prevented from activating the actuatable device. The process 650 continues to sum the cycle-on timings as the cycle and soak control unit 102 switches between cycle-on and soak-off states.

At step 664 the process determines whether the activation signal continues to be applied at the input connector 103. When the activation signal continues to be applied, the process returns to step 656 to close the switch 306 to again allow the activation signal to pass through the cycle and soak control unit 102 to the relevant actuatable device(s) 114, and again in step 658 tracks the time for the cycle-on time. When it is determined in step 664 that the activation signal is no longer detected, the process continues to step 668 where the active signal timer is stopped to obtain a total irrigation program runtime of the activation signal. In step 670, an extended activation signal is applied to the corresponding one or more output connectors for the duration of the cycle-on timing. The signal can be generated through a local power source (e.g., battery, rechargeable battery, capacitors, other such storage devices, or combination of such storage devices), an external power source (e.g., a standard electrical outlet), other such power source or combination of power sources. In step 672, the one or more switches 306 are triggered to transition to a soak-off or interrupt state interrupting the extended activation signal for the soak-off timing. In step 674, the duration of the cycle-on time is summed with the duration of previous cycle-on timings. In step 674, it is determined whether a total cycle-on timing corresponding to an activation signal is within a threshold of the duration that the activation signal was received on the input connector. The threshold may be a preset, set by a user, or the like. In some instances, the threshold corresponds to substantially equal to the time the activation signal is applied. In other instances, the threshold may be a percentage (e.g., 75%, 80%, etc.). The percentage allows the application of a reduced amount of water, such as because of the expected reduced run-off. When the total cycle-on time is not within the threshold, the process 650 returns to step 670 to again apply the extended activation signal. When the total cycle-on time is within the threshold the process halts the application of the extended activation signal, and returns to step 652 to await the detection of the activation signal at the input connector 103. In some embodiments, the process 650 may include an override interrupt that halts the process 650 in response to the total cycle-on timing being within the threshold of the duration of the activation signal. Again, some embodiments prevents the simultaneous activation of a threshold number of connector pairs, which may be consistent with a number of activation signals simultaneously detected on input connectors 103. The cycle and soak control unit can track the durations of different activation signals, and control the cycle-on timings of different output connectors to achieve total runtimes that are consistent with the programmed irrigation runtimes, and while controlling activation to limit adverse effects from a result of insufficient water pressure.

Figure 7:
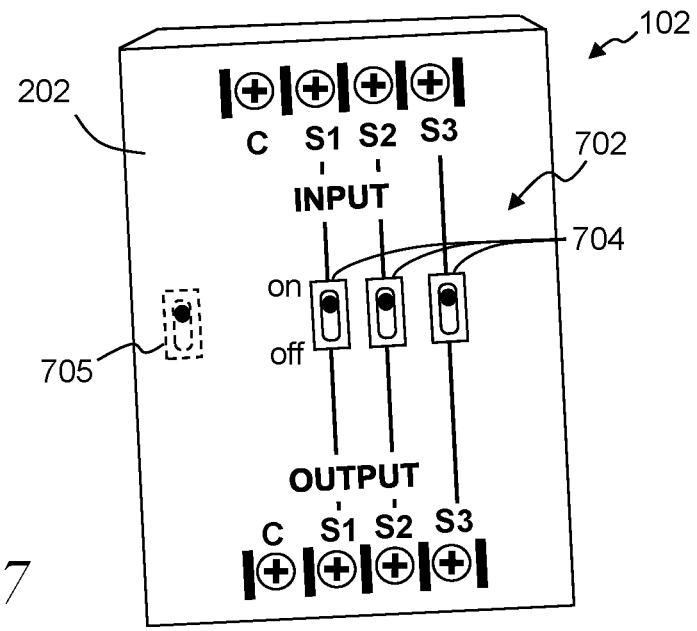
FIG. 7 illustrates a simplified block diagram of an exemplary cycle and soak control unit having a user interface secured with the housing, in accordance with some embodiments.

As described above, in some embodiments, the cycle and soak control unit 102 includes a user interface. FIG. 7 illustrates a simplified block diagram of an exemplary cycle and soak control unit 102 having a user interface 702 secured with the housing 202, in accordance with some embodiments. The user interface 702 includes one or more disable options 704 that are selectable and/or movable by the user. In some instances, the disable options 704 may be dip switches, push buttons, levers or other such options that allow the user to define whether the cycle and soak control unit is to control activation signals. When the disable option is in a first state, the cycle and soak control unit does not implement the cycle and soak functionality for at least a corresponding one or more electrical pathways, and thus maintains the corresponding one or more switches in the closed state allowing activation signals to pass through the cycle and soak control unit without interrupting the activation signals. Alternatively, when the disable option 704 is in a second state, the cycle and soak control unit 102 operates to implement the cycle and soak functionality to interrupt the activation signal during the soak-off timing. In some embodiments, there is a single or master disable option 705 (e.g., coupled with each of the timing control units 402, the common line electrical pathway, etc.) that disables the cycle and soak functionality of the cycle and soak control unit. Some embodiments include one or more disable options 704 associated with each electrical pathway and/or each input and output connector pair. These disable options 704 may couple with a respective one of the timing control units 402 to set the timing control unit into an active state to implement the cycle and soak functionality, and a disable state disabling the timing control circuit from preventing the activation signal from be applied to a corresponding one or more output connectors 107. In the disable state, for example, a timing control unit does not activate the cycle and soak functionality for that electrical pathway and does cause an interruption of the activation signal for the soak-off timing. The disable options 704 may be cooperated with an exterior of the housing 202, within an opening formed in the housing, or the like.

Figure 8:
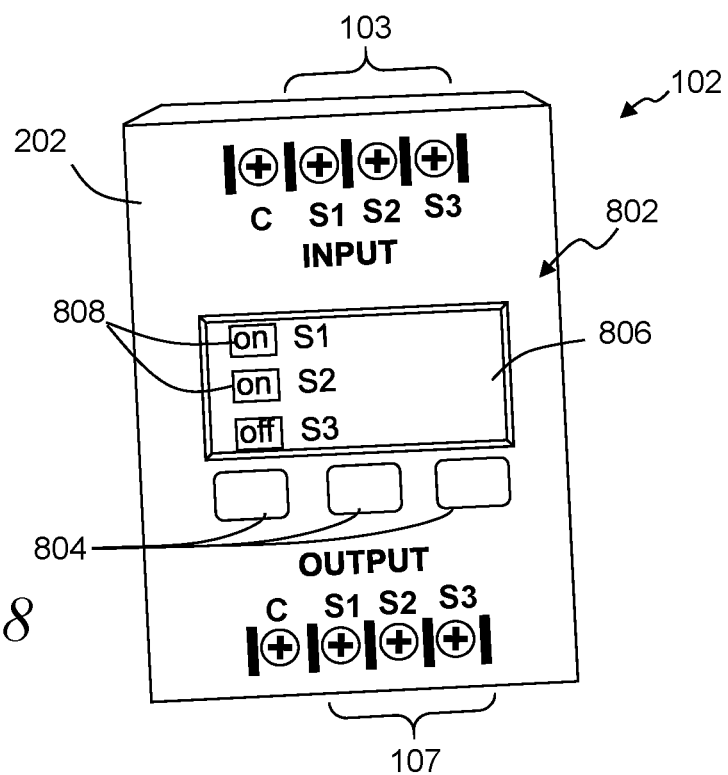
FIG. 8 illustrates a simplified block diagram of an exemplary cycle and soak control unit, in accordance with some embodiments, having a user interface.

FIG. 8 illustrates a simplified block diagram of an exemplary cycle and soak control unit 102, in accordance with some embodiments, having a user interface 802. The user interface 802 can include one or more selectable options 804, which may be physical buttons, switches, or the like, and/or options displayed on a display 806 that are selectable by a user through a touchscreen and/or one or more physical buttons that correspond with a displayed option. In some instances, the display may be a touchscreen, and in other instances one or more selectable options 804 may cause a displayed selection or highlighting option to transition between different displayed options 808, that can be selected through one or more of the selectable options and/or the touchscreen. In some implementations, the display 806 is coupled with the timing control circuit and/or other control circuit (e.g., an additional processor) that controls the display to display options 808 and/or other information. For example, the display can be controlled to display the defined duration of the cycle-on timings and the soak-off timings defined in response to detecting a selection of one or more selectable options. In some applications, the housing may include a door, flap or the like that can be opened to expose the display and/or user interface, or closed to protect the display and/or user interface. Additionally or alternatively, the housing may include one or more doors, flaps or the like that when opened exposes the input connectors and/or output connectors. The doors may establish a water tight seal when closed.

In some embodiments, the timing control units 402 are each implemented by separate microcontrollers having firmware storing one or more cycle-on timing and soak-off timing corresponding to the one or more corresponding station actuation lines. In other implementations, the microcontrollers are programmable to specify and/or selected one or more predefined sets of cycle-on and soak-off timings, and/or programmable to receive one or more specified cycle-on and soak-off timings, which can be stored in a local memory on the microcontroller or a separate memory accessible to the microcontroller. In some embodiments, one or more of the timing control units 402 couple with one or more user interfaces of the cycle and soak control unit 102, while in other implementations, separate control circuitry and/or user interface controller are incorporated into the cycle and soak control unit 102 to provide control over the user interface.

Figure 9:
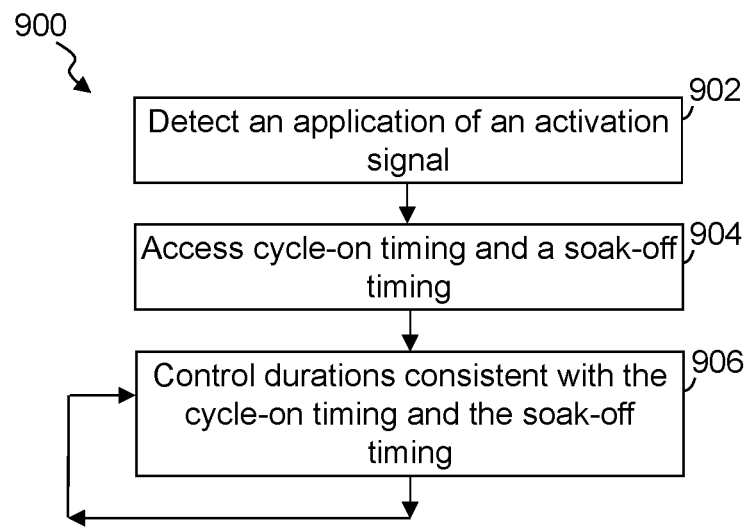
FIG. 9 illustrates a simplified flow diagram of an exemplary process of implementing irrigation cycle and soak functionality, in accordance with some embodiments.

FIG. 9 illustrates a simplified flow diagram of an exemplary process 900 of implementing irrigation cycle and soak functionality, in accordance with some embodiments. In step 902, an application of an activation signal from a separate and external irrigation controller is detect at an input connector 103 of a pair of actuation line connectors of a housing 202 of the cycle and soak control unit 102. In step 904, one or more predefined cycle-on timings and one or more soak-off timings are accessed that correspond to the input connector.

In step 906, at least one switch 306 is repeatedly and sequentially controlled according to a predefined cycle and soak sequence in accordance with the activation signal received from the irrigation controller. The controlling of the switch includes controlling: durations consistent with the cycle-on timing during which the activation signal activates a separate and external actuatable device 114, and durations consistent with the soak-off timing during which the activation signal is prevented from activating the first actuatable device.

In some embodiments, an application of an activation signal from a separate and external irrigation controller is detect at an input connector 103 of a pair of actuation line connectors of a housing 202 of the cycle and soak control unit 102. One or more predefined cycle-on timings and one or more soak-off timings are accessed and/or identified that correspond to the input connector upon which that activation signal is being applied.

At least one switch 306 can be controlled according to a predefined cycle and soak sequence to control a durations consistent with the accessed cycle-on timing during which the activation signal is passed to the output connector 107 to activate a separate and external actuatable device 114. Further, the switch 306 is controlled to control a duration consistent with the identified soak-off timing during which the activation signal is prevented from activating the actuatable device. The control of the switch according to the cycle-on timing and the soak-off timing can be repeatedly and sequentially implemented in accordance with the activation signal (e.g., while the activation signal is received from the irrigation controller, for a total cycle-on time consistent with the detected duration of the activation signal, for a predefined percentage of the duration of the activation signal, or the like).

In controlling one or more switches 306, some embodiments control a switch to open and close a common line electrical pathway 304 within the housing in controlling the activation and deactivation of the actuatable device 114 consistent with the cycle-on timing and the soak-off timing. In some embodiments, one or more of a plurality of switches 306 each coupled with one of a plurality of electrical pathways 302 within the housing that couples a respective input connector 103 to a respective corresponding output connector 107 of the plurality of pairs of actuation line connectors is independently controlled through a respective one of a plurality of timing control units 402 of the timing control circuit 308 that are each coupled with a respective one of the plurality of switches.

The timing control circuit 308, in some applications, draws power from the activation signal and powers the timing control circuit in controlling the one or more switches 306. Further, the cycle and soak control unit 102 may, in some implementations, receive a defined duration of at least one of the cycle-on timing and the soak-off timing based on a selection of a selectable option 704, 804, 808 of a user interface 702, 802 secured with the housing. As described above, the cycle and soak control unit may display on a display of the user interface 802 the defined duration of at least one of the cycle-on timing and the soak-off timing. The defined durations may be received based on a detection of a selection of a physical button 804 of a plurality of physical buttons that are secured with the housing and selectable by a user.

The user interface may additionally or alternatively include a disable options 704. The timing control circuit may detect an activation of a disable option cooperated with the housing, which can disable the timing control circuit from preventing the activation signal from being applied to an output connector 107 coupled with the respective electrical pathway within the housing that couples a respective input connector to the respective corresponding output connector. Further, in some embodiments, a defined duration of the cycle-on timing and the soak-off timing may be received from the irrigation controller 100. In other implementations, a defined duration of the cycle-on timing and the soak-off timing may be wirelessly received.

Some embodiments detect, at an input connector 103 of a first pair of actuation line connectors cooperated with the housing, an application of an activation signal from an irrigation controller 100, which is separate from and external to the housing of the cycle and soak control unit 102. A cycle-on timing and a soak-off timing can be identified that are defined for the input connector on which the activation signal is detected. One or more switches can be controlled to repeatedly and sequentially: enable the activation system to pass to an output connector for the cycle-on timing; and prevent the activation signal from passing to the output connector for the soak-off timing. In some instances a switch 306 cooperated with the common line can be activated to implement the control over one or more activation signals by closing and opening the common line and interrupting the operation of the intended one or more actuatable devices 114. In other instances, one or more switches of internal electrical pathways 302 can be independently controlled to control the output of activation signals to the output connectors 107.

Figure 10:
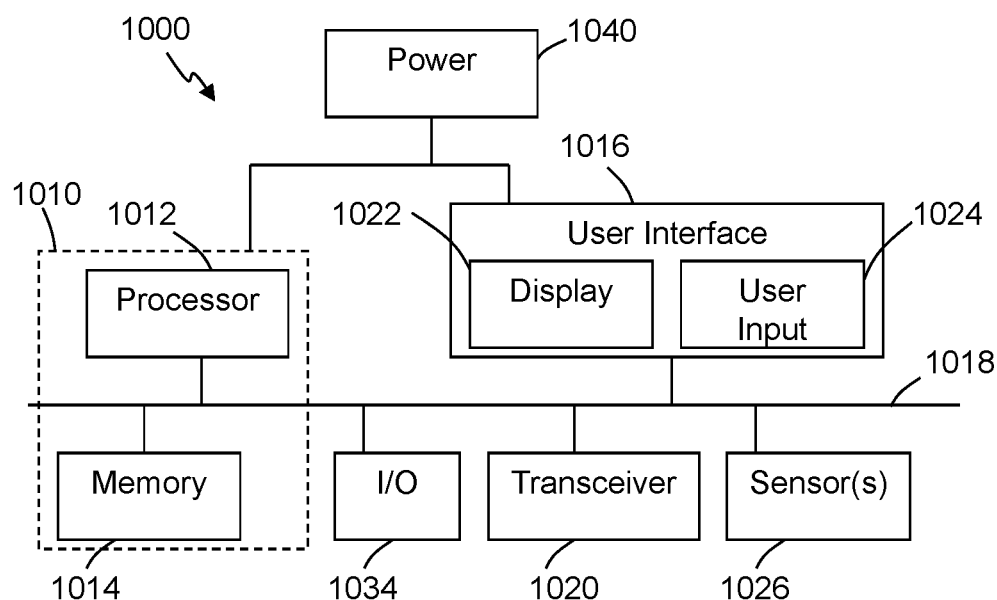
FIG. 10 illustrates an exemplary system for use in implementing methods, techniques, devices, apparatuses, systems, servers, sources and enabling irrigation control, in accordance with some embodiments.

Further, the circuits, circuitry, systems, devices, processes, methods, techniques, functionality, services, servers, sources and the like described herein may be utilized, implemented and/or run on many different types of devices and/or systems. FIG. 10 illustrates an exemplary system 1000 that may be used for implementing any of the units, components, circuits, circuitry, systems, functionality, apparatuses, processes, or devices of the irrigation system of FIG. 1, and/or other above or below mentioned systems or devices, or parts of such circuits, circuitry, functionality, systems, apparatuses, processes, or devices. For example, the system 1000 may be used to implement some or all of the cycle and soak control unit 102, the timing control circuit 308, the timing control unit 402, the irrigation controller 100, microcontroller 500, and/or other such components, circuitry, functionality and/or devices. However, the use of the system 1000 or any portion thereof is certainly not required.

By way of example, the system 1000 may comprise a control circuit or processor module 1012, memory 1014, and one or more communication links, paths, buses or the like 1018. Some embodiments may include one or more user interfaces 1016, and/or one or more internal and/or external power sources or supplies 1040. The control circuit 1012 can be implemented through one or more processors, microprocessors, central processing unit, logic, local digital storage, firmware, software, and/or other control hardware and/or software, and may be used to execute or assist in executing the steps of the processes, methods, functionality and techniques described herein, and control various decisions, programs, activations, triggers, storage, communications, interfaces, logging, etc. Further, in some embodiments, the control circuit 1012 can be part of control circuitry and/or a control system 1010, which may be implemented through one or more processors with access to one or more memory 1014 that can store instructions, code and the like that is implemented by the control circuit and/or processors to implement intended functionality. Again, the system 1000 may be used to implement one or more of the above or below, or parts of, units, circuits, systems, circuitry, components, processes and the like.

Some embodiments include a user interface 1016 that can allow a user to interact with the system 1000 and receive information through the system. In some instances, the user interface 1016 includes a display 1022 and/or one or more user inputs 1024, such as buttons, touch screen, track ball, keyboard, mouse, etc., which can be part of or wired or wirelessly coupled with the system 1000. Typically, the system 1000 further includes one or more communication interfaces, ports, transceivers 1020 and the like allowing the system 1000 to communicate over a communication bus, wirelessly, a distributed computer and/or communication network (e.g., a local area network (LAN), the Internet, wide area network (WAN), etc.), communication link 1018, other networks or communication channels with other devices and/or other such communications or combination of two or more of such communication methods. Further the transceiver 1020 can be configured for wired, wireless, optical, fiber optical cable, or other such communication configurations or combinations of two or more of such communications. Some embodiments include one or more input/output (I/O) ports 1034 that allow one or more devices to couple with the system 1000. The I/O ports can be substantially any relevant port or combinations of ports, such as but not limited to USB, Ethernet, or other such ports. The I/O interface 1034 can be configured to allow wired and/or wireless communication coupling to external components. For example, the I/O interface can provide wired communication and/or wireless communication (e.g., Wi-Fi, Bluetooth, cellular, RF, and/or other such wireless communication), and in some instances may include any known wired and/or wireless interfacing device, circuit and/or connecting device, such as but not limited to one or more transmitters, receivers, transceivers, or combination of two or more of such devices.

The system 1000 comprises an example of a control and/or processor-based system with the control circuit 1012. Again, the control circuit 1012 can be implemented through one or more processors, controllers, central processing units, logic, software and the like. Further, in some implementations the control circuit 1012 may provide multiprocessor functionality.

The memory 1014, which can be accessed by the control circuit 1012, typically includes one or more processor readable and/or computer readable media accessed by at least the control circuit 1012, and can include volatile and/or non-volatile media, such as RAM, ROM, EEPROM, flash memory and/or other memory technology. Further, the memory 1014 is shown as internal to the control system 1010; however, the memory 1014 can be internal, external or a combination of internal and external memory. Similarly, some or all of the memory 1014 can be internal, external or a combination of internal and external memory of the control circuit 1012. The external memory can be substantially any relevant memory such as, but not limited to, solid-state storage devices or drives, hard drive, one or more of universal serial bus (USB) stick or drive, flash memory secure digital (SD) card, other memory cards, and other such memory or combinations of two or more of such memory, and some or all of the memory may be distributed at multiple locations over the computer network. The memory 1014 can store code, software, executables, scripts, data, content, lists, programming, programs, log or history data, user information, customer information, product information, and the like. While FIG. 10 illustrates the various components being coupled together via a bus, it is understood that the various components may actually be coupled to the control circuit and/or one or more other components directly.

In some embodiments, the cycle and soak control unit 102 provides an aftermarket product, which is wired in between an irrigation controller 100 and the one or more actuatable devices 114. The cycle and soak control unit 102 can be installed inside or outside and includes input connectors 103 that couple with station actuation lines 108 from the irrigation controller, and export or output connectors 107 that couple with station actuation lines 132 to the actuatable devices 114. The cycle and soak control unit 102 can be positioned in substantially any location, and in some implementations includes mounting structures, such as screw holes, punch outs, brackets, hooks and/or other such mounting structures. In some implementations, the cycle and soak control unit may be mounted to an irrigation controller 100, adjacent an irrigation controller, positioned within a housing of the irrigation controller, positioned in a valve box below ground, positioned with actuatable devices 114 distant from the irrigation controller, or in other relevant locations. The wires that typically lead back to the irrigation controller 100 can be wired to the connectors of the cycle and soak control unit. In some implementation, the housing 202 provides a weather proof enclosure to protect the internal circuitry and/or components. In still other implementations, the housing provides a water-tight seal enabling the cycle and soak control unit 102 to be submerged in water. Further, the cycle and soak control unit can be implemented in at least some embodiments without altering the operation of the irrigation controller 100. Typically, the irrigation schedule does not have to be changed to accommodate the cycle and soak functionality provided through the cycle and soak control unit. Further, the cycle and soak control unit often provides a reduction in water consumption while maintaining or even improving plant life conditions by in part limiting water run-off.

In some embodiments, the cycle and soak control unit 102 does not couple with external power to operate, and instead receives input power from the activation signals from the irrigation controller 100 that is intended to control the actuatable devices 114. Utilizing the cycle-on timing and the soak-off timing the cycle and soak control unit board interrupts the activation signal that is applied to the actuatable device, which will turn off the actuatable device (e.g., valve) for the soak-off preset amount of time. The irrigation controller 100 continues to operate during the soak-off time, and typically is unaware of the interrupt. After the soak-off timing has elapsed, the cycle and soak control unit 102 allows the activation signal to pass to the actuatable device turning the actuatable device back on.

The cycle-on timing and the soak-off timing can be substantially any duration (e.g., from 1 second to unlimited minutes). Similarly, the cycle and soak control unit 102 can be configured with substantially any number of connector pairs to enable control of substantially number of actuatable devices. Further, the cycle and soak control unit can control substantially any number of actuatable devices limited by the number of valves that are wired to an irrigation controller 100.

As a non-limiting example, a cycle and soak control unit 102 can be programmed to allow 3 minutes of irrigation cycle-on timing, and 1 minute of soak-off timing. If the irrigation controller is scheduled to run 20 minutes on a particular station actuation line, an exemplary cycle and soak irrigation process would be as follows: minutes 1-3 allows the irrigation; minute 3-4 interrupts irrigation (i.e., for 1 minute); minutes 4-7 allows the irrigation; minute 7-8 interrupts irrigation; minutes 8-11 allows irrigation; minute 11-12 interrupts irrigation; minutes 12-15 allows irrigation; minute 15-16 stops irrigation; minutes 16-19 allows irrigation; minute 19-20 interrupts irrigation; and the irrigation cycle is stopped upon the termination of the activation signal. In this example, irrigation is interrupted for 4 of the programmed 20 minutes, which is a 20% reduction in water usage. It is recognized that a user may increase the irrigation program run time if the plant life of one or more irrigation zones are stressed, which could negate/reduce the water savings.

While the invention herein disclosed has been described by means of specific embodiments and applications thereof, other modifications, variations, and arrangements of the present invention may be made in accordance with the above teachings other than as specifically described to practice the invention within the spirit and scope defined by the following claims. Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A cycle and soak irrigation control unit, comprising:
    a housing;
    a first input connector configured to couple with a first output of an irrigation controller, wherein the irrigation controller is separate from and external to the cycle and soak irrigation control unit;
    a first output connector configured to couple to a first irrigation actuatable device configured to control a flow of water; and
    a timing control circuit configured to:
        detect a first activation signal from the irrigation controller received at the first input connector; and
        control an output of the first activation signal from the first output connector according to a predefined cycle and soak sequence to control a duration of a series of cycle-on timings during which the first activation signal is outputted from the first output connector to activate the first irrigation actuatable device and soak-off timings during which the first activation signal is not outputted from the first output connector deactivating the first actuatable device.

2. The cycle and soak control unit of claim 1, wherein the timing control circuit is further configured to:
    determine an intended total programmed runtime of the first activation signal based on a duration the first activation signal is received on the first input connector; and
    continue to control the output of the first activation signal from the first output connector, after the first activation signal is no longer received on the first input connector, according to the predefined cycle and soak sequence to cycle through the cycle-on timings and soak-off timings until a summation of the cycle-on timings is within a threshold of the total programmed runtime.

3. The cycle and soak control unit of claim 2, wherein the timing control circuit is further configured to active, in response to the detection of the first activation signal, a signal timer until the first activation signal is no longer detected, and obtain the duration of the first activation signal consistent with the total programmed runtime of the first activation signal.

4. The cycle and soak control unit of claim 2, further comprising:
    a second input connector configured to couple with a second output of the irrigation controller; and
    a second output connector configured to couple to a second irrigation actuatable device configured to control a second flow of water;
    wherein the timing control circuit is further configured to:
    track a duration of a second activation signal from the irrigation controller received at the second input connector and while controlling at least the first activation signal outputted from the first output connector;
    queue a subsequent control of the second activation signal while controlling the output of the first activation signal from the first output connector until at least the total cycle-on timing is within the threshold of the total programmed runtime of the first activation signal; and
    subsequently control an output of the second activation signal on the second output connector, after the total cycle-on timing of the first activation signal outputted on the first output connector is within the threshold of the total programmed runtime of the first activation signal, according to the predefined cycle and soak sequence to control a duration of a series of second cycle-on timings and second soak-off timings until a total second cycle-on timing is within a second threshold of a second total programmed runtime of the second activation signal.

5. The cycle and soak control unit of claim 2, further comprising:
    a second input connector configured to couple with a second output of the irrigation controller; and
    a second output connector configured to couple to a second irrigation actuatable device configured to control a second flow of water;
    wherein the timing control circuit is further configured to:
    detect a second activation signal from the irrigation controller received at the second input connector; and
    control an output of the second activation signal from the second output connector during the soak-off timings of the first activation signal outputted from the first output connector and according to a second predefined cycle and soak sequence to control a second duration of a series of second cycle-on timings during which the second activation signal is outputted from the second output connector to activate a second actuatable device.

6. The cycle and soak control unit of claim 5, wherein the timing control circuit is further configured to modify the soak-off timings of the first activation signal to accommodate at least one of the second cycle-on timings of the second activation signal outputted from the second output connector.

7. The cycle and soak control unit of claim 2, wherein the timing control circuit draws power from the first activation signal in powering the timing control circuit and outputting the first activation signal on the first output connector after the first activation signal is no longer received at the first input connector.

8. The cycle and soak control unit of claim 2, further comprising:
 a user interface secured with the housing and comprising at least one selectable option to define the duration of at least one of the cycle-on timings and the soak-off timings.

9. The cycle and soak control unit of claim 2, further comprising a disable option activatable by a user and coupled with the timing control circuit, wherein the disable option is configured to disable the timing control circuit from implementing the soak-off timings interrupting the first activation signal.

10. The cycle and soak control unit of claim 2, wherein the timing control circuit is configured to detect from the irrigation controller a defined duration of the at least one of the cycle-on timings and the soak-off timings.

11. The cycle and soak control unit of claim 2, further comprising:
 a wireless transceiver coupled with the timing control circuit and configured to wirelessly receive a defined duration of the at least one of the cycle-on timings and the soak-off timings.

12. A method of implementing irrigation cycle and soak functionality, comprising:
 detecting, at a first input connector cooperated with a housing, an application of a first activation signal from a separate and external irrigation controller;
 accessing a first cycle-on timing and a first soak-off timing; and
 repeatedly and sequentially controlling an output of the first activation signal from a first output connector according to a predefined cycle and soak sequence to control durations of a series of cycle-on timings during which the first activation signal is outputted from the first output connector to activate a separate and external first actuatable device, and soak-off timings during which the first activation signal is interrupted and not outputted from the first output connector deactivating the first actuatable device.

13. The method of claim 12, further comprising:
 determining an intended total programmed runtime of the first activation signal based on a duration the first activation signal is received on the first input connector; and
 continuing to control the output of the first activation signal from the first output connector, after the first activation signal is no longer received on the first input connector, according to the predefined cycle and soak sequence to cycle through the cycle-on timings and soak-off timings until a summation of the cycle-on timings is within a threshold of the total programmed runtime.

14. The method of claim 13, further comprising:
 activating, in response to the detection of the first activation signal, a signal timer until the first activation signal is no longer detected, and obtaining the duration of the first activation signal consistent with the total programmed runtime of the first activation signal.

15. The method of claim 13, further comprising:
 tracking a duration of a second activation signal from the irrigation controller received at a second input connector and while controlling at least the first activation signal outputted from the first output connector;
 queuing a subsequent control of the second activation signal while controlling the output of the first activation signal from the first output connector until at least the total cycle-on timing is within the threshold of the total programmed runtime of the first activation signal; and
 subsequently controlling an output of the second activation signal on a second output connector, after the total cycle-on timing of the first activation signal outputted on the first output connector is within the threshold of the total programmed runtime of the first activation signal, according to the predefined cycle and soak sequence to control a duration of a series of second cycle-on timings and second soak-off timings until a total second cycle-on timing is within a second threshold of a second total programmed runtime of the second activation signal.

16. The method of claim 13, further comprising:
 detecting a second activation signal from the irrigation controller received at a second input connector; and
 controlling an output of the second activation signal from a second output connector during the soak-off timings of the first activation signal outputted from the first output connector and according to a second predefined cycle and soak sequence to control a second duration of a series of second cycle-on timings during which the second activation signal is outputted from the second output connector to activate a second actuatable device.

17. The method of claim 16, further comprising:
 modifying the soak-off timings of the first activation signal to accommodate at least one of the second cycle-on timings of the second activation signal outputted from the second output connector.

18. The method of claim 13, further comprising:
 drawing power from the first activation signal and powering the timing control circuit and outputting the first activation signal on the first output connector after the first activation signal is no longer received at the first input connector.

19. The method of claim 13, further comprising:
 receiving a defined duration of at least one of the first cycle-on timing and the first soak-off timing based on a selection of a selectable option of a user interface secured with the housing.

20. The method of claim 13, further comprising:
 detecting an activation of a disable option cooperated with the housing; and
 disabling the timing control circuit from implementing the soak-off timings interrupting the first activation signal.

21. The method of claim 13, further comprising:
 receiving a defined duration of the first cycle-on timing and the first soak-off timing from the irrigation controller.

22. The method of claim 13, further comprising:
wirelessly receiving a defined duration of the first cycle-on timing and the first soak-off timing.

\* \* \* \* \*